United States Patent [19]
Matsumura

[11] Patent Number: 6,130,803
[45] Date of Patent: Oct. 10, 2000

[54] ACTUATOR LOCKING MECHANISM

[75] Inventor: Yoshizumi Matsumura, Ayase, Japan

[73] Assignee: International Business Machines Corporation, Armonk, N.Y.

[21] Appl. No.: 09/059,599

[22] Filed: Apr. 13, 1998

[30] Foreign Application Priority Data

Apr. 22, 1997 [JP] Japan ................................. 9-104191

[51] Int. Cl.⁷ .................................................. G11B 21/22
[52] U.S. Cl. ............................................................. 360/105
[58] Field of Search ................................... 360/104, 105, 360/106

[56] References Cited

U.S. PATENT DOCUMENTS

| | | | |
|---|---|---|---|
| 5,313,354 | 5/1994 | Sampietro et al. | 360/105 |
| 5,363,261 | 11/1994 | Eckberg et al. | 360/105 |
| 5,365,389 | 11/1994 | Jabbari et al. | 360/105 |
| 5,568,333 | 10/1996 | Bang | 360/105 |
| 5,734,527 | 3/1998 | Reinhart | 360/105 |
| 5,793,572 | 8/1998 | Lalouette et al. | 360/105 |
| 5,815,350 | 9/1998 | Kennedy et al. | 360/105 |

FOREIGN PATENT DOCUMENTS

| | | |
|---|---|---|
| 62-287475 | 12/1987 | Japan . |
| 5-151737 | 6/1993 | Japan . |
| 6-44714 | 2/1994 | Japan . |
| 9-231695 | 9/1997 | Japan . |

*Primary Examiner*—David L. Ometz
*Attorney, Agent, or Firm*—Noreen A. Krall; Randall J. Bluestone

[57] ABSTRACT

The present invention provides an actuator locking mechanism which is structurally simple and has a strong locking force. The actuator locking mechanism has an actuator on which a slider having a transducer mounted thereon for transferring information between the transducer and a storage medium is mounted and which is driven so that the element scans the storage medium, an attracting member which is magnetically attractable with at least a portion of the actuator when the actuator is driven so that the slider is moved to a non-recording region of the storage medium, a support member on which the attracting member is mounted and which is rotatably attached to the base, and a spring which is engaged with the support member and gives elastic force to the support member so that the actuator attracted magnetically to the attracting member is given force in a direction where the slider is directed from the recording region of the storage medium to the non-recording region. The spring absorbs an external impact force and therefore a locking force is enhanced.

5 Claims, 7 Drawing Sheets

ACTUATOR LOCKING MECHANISM

BACKGROUND OF THE INVENTION

1. Field of the Invention

The present invention relates to an actuator locking mechanism for an information storage device, and more particularly to a locking mechanism and a locking method which make use of a magnet and enhance a locking force with respect to impact force.

2. Description of the Related Art

In information storage devices that are represented by a magnetic storage device, a transducer for reading and/or writing data is attached to an actuator, and the actuator is driven so that the transducer scans a storage medium. When recording or writing is not performed, the transducer is retracted to the actuator's stop position away from the recording region of the storage medium. In order for the transducer not to be moved to the recording region, even if an external impact force is applied to a magnetic storage device when the actuator is in the stopped position, there is an actuator locking mechanism which locks the actuator to a base.

One example of an actuator locking mechanism is a fixed magnet type locking mechanism, such as that described in Published Unexamined Patent Application No. 5-151737. The fixed magnet type locking mechanism attracts a portion of the actuator in its stopped position with a permanent magnet fixed to the base of the magnetic storage device to lock the actuator, and has the feature that it is simple in structure and easy to miniaturize. However, when impact force sufficient to move an actuator is applied to the magnetic storage device, an actuator being locked to the base by magnetic attraction is not allowed to move in the attracted state at all and therefore the impact force to the actuator is applied directly and entirely to the attracting surfaces. Since there is a limitation on an enhancement in the magnetic attraction, the attracting surfaces of the permanent magnet and the actuator cannot be attracted enough to lock the actuator to the base with respect to a large impact force applied to the actuator. Moreover, the recent miniaturization and portability demand for a computer having a magnetic storage device mounted therein requires a further miniaturization in the magnetic storage, which also sets limits on the size of the magnet being increased in order to enhance the locking force of the locking mechanism, further increases the magnitude of impact force that is applied to the magnetic storage device, and gives further impetus to the problem that the actuator cannot be locked sufficiently in the stop position.

Another locking mechanism disclosed in Published Unexamined Patent Application No. 5-151737, is a solenoid type locking mechanism provided with a solenoid and a mechanical latching mechanism. Although the solenoid type can sufficiently obtain a force for locking an actuator, the solenoid type locking mechanism becomes complicated in structure and is increased in size, as compared with the magnet type locking mechanism. Consequently, the solenoid type is not sufficiently satisfactory as an actuator locking mechanism for a magnetic storage device demanding miniaturization and portability.

As previously described, the conventional actuator locking mechanism has the disadvantage that it cannot exhibit a strong locking force with a small size, while the solenoid locking mechanism is complicated in structure. Accordingly, it can be seen from the problems described in the prior art that there is a need to provide a magnetic actuator locking mechanism equipped with an even stronger locking force, while allowing the device size to be reduced and maintaining a simple structure.

SUMMARY OF THE INVENTION

To overcome the shortcomings of the prior art described previously, it is an object of the present invention to provide a magnetic type locking mechanism for an actuator equipped a stronger locking force, having a reduced size and a simple structure. Still another object of the present invention is to provide an information storage device employing the actuator locking mechanism provided by the present invention.

Briefly stated, the present invention is an actuator locking mechanism making use of a magnet and an elastic member which is interposed between a portion of an actuator and a base. When impact force causes the actuator to move from the locked position, the elastic member allows movement of the actuator in a direction where the actuator is caused to move by the impact force, in the state where the magnetic attraction between the actuator and the base is maintained. While the actuator is moving slightly, the elastic member is elastically deformed and exhibits elastic force. The elastic force acts so as to resist the movement of the actuator caused by the impact force. The elastic deformation of the elastic member absorbs the impact force applied to the actuator, and consequently, the impact force which is applied to a magnetically attracted portion is buffered and the locking force of the locking mechanism is enhanced with respect to the impact force.

The actuator locking mechanism of the present invention, for use with an information storage device, locks an actuator to a base so that the actuator is not moved with an external impact force. The actuator locking mechanism comprises an actuator on which a magnetic recording head or transducer for transferring information between the element and a storage medium is mounted and which is driven to scan the storage medium, an attracting member which is magnetically attractable with at least a portion of the actuator at a stop position of the actuator, and an elastic member joined to the attracting member and the base. By an external impact force given to the information storage device during the time the portion of the actuator is attracted to the attracting member, the elastic member is elastically deformed to give elastic force to the actuator, whereby the elastic member absorbs the impact force. Here, the stop position of the actuator is referred to as a place which exists within an driving range of the actuator, and where the drive of the actuator is stopped and movement of the actuator by an external impact force is to be restricted.

The elastic member may be comprised of a support member having an attracting member mounted thereon and a spring engaging with the support member. The support member is attached to the base movably along with the actuator when the actuator is moved by an external impact force in the state where a portion of the actuator and the attracting member have been attracted with each other. When the support member moves along with the actuator, the spring is elastically deformed and gives elastic force in a direction which resists movement of the support member, thereby absorbing impact force.

The elastic member may also be comprised of a support member on which an attracting member is mounted and which is rotatably attached to a base and a spring which engages with the support member. If an external impact force is given while a portion of the actuator and the attracting member have been attracted with each other, the support member will be rotated in compliance with movement of the actuator. At this time, the spring engaged with the support member is elastically deformed and gives elastic force to the support member in a direction which resists the rotation, thereby absorbing impact force.

Next, when the attracting member is rotatably attached to the support member and the actuator is moved by impact force while the actuator is attracted to the attracting member, the reduction in the area of the attracted surface caused by a difference between the locus of movement of an attracted portion on the actuator and the locus of movement of an attracting member on the support member is prevented and therefore the attracting force is further enhanced.

Alternatively, the elastic member has similar advantages, even if arranged on the side of the actuator.

The actuator locking method of the present invention is comprised of a method of locking an actuator to a base to avoid being moved with an external impact force in an information storage device. The actuator locking method comprises the steps of: providing an actuator on which a slider having an element for transferring information between the element and a storage medium is attached and which is driven to scan the storage medium; providing the actuator to move to a region other than a recording region of the storage medium; locking the actuator to the base by attracting a portion of the driven actuator; and allowing the actuator to move in a direction where the locked actuator is moved from the region other than the recording region of the storage medium into the recording region when an external impact force is applied, and applying elastic force to the actuator which resists movement of the actuator caused by the impact force.

An information storage device of the present invention comprises an information storage medium, an actuator on which a slider having an element mounted thereon is mounted for transferring information between the element and a storage medium and which is capable of moving the slider to a recording region and a non-recording region of the information storage medium, and an actuator locking mechanism of the present invention.

The above, as well as the additional objects, features and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

This invention is described in a preferred embodiment in the following description with reference to the Figures, in which like numbers represent the same or similar elements. While this invention is described in the terms of the best mode for achieving this invention's objectives, it will be appreciated by those skilled in the art that variations may be accomplished in view of these teachings without deviating from the spirit or scope of the invention.

Figure 1:
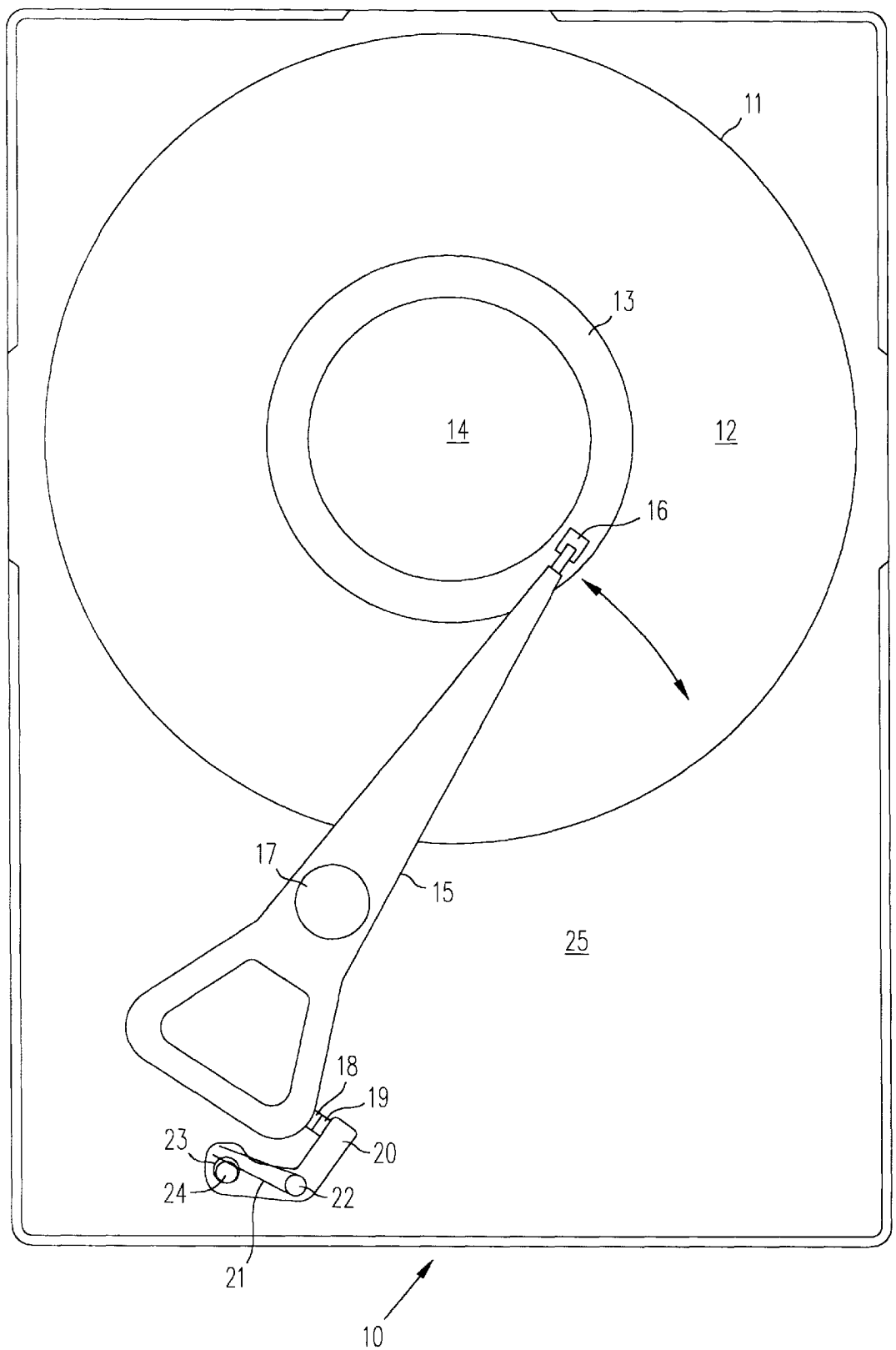
FIG. 1 is a schematic plan view showing a magnetic storage device which incorporates an actuator locking mechanism according to the present invention.

FIG. 1 is a schematic plan view showing an embodiment where an actuator locking mechanism of the present invention is applied to a magnetic storage device 10. A magnetic disk 11 for an information storage medium includes a recording region 12 which is utilized to store information and a non-recording region 13 where a transducer 16 is positioned during the time writing or reading is stopped. The magnetic disk 11 is fastened to a spindle 14, which is rotated by a spindle motor (not shown). The magnetic disk 11 rotates along with the spindle 14, when information is written to or read from the magnetic disk 11. A slider (not shown) is attached to the front end portion of the actuator 15 through a flexible member. The transducer 16, which performs writing and/or reading of information with respect to the magnetic disk 11, is mounted on the slider. When information is written to or read from the magnetic disk 11, the actuator 15 is rotated on a shaft 17 to position the transducer 16 over the surface of the magnetic disk 11 being rotated and then the transducer 16 scans an arbitrary position on the surface of the magnetic disk 11. At this time, a thin cushion of air is created between the surface of the magnetic disk 11 being rotated and the surface of the opposed slider and floats the slider. The slider and the transducer 16, attached to the actuator 15 through a flexible member, float while holding a predetermined distance from the surface of the magnetic disk 11, and that distance is maintained.

When writing or reading is stopped, the actuator 15 is retracted to the stop position. The actuator 15 is driven so that the slider is retracted to the non-recording region 13, and after the slider is locked in the non-recording region 13, the rotation of the magnetic disk 11 is stopped. The surface of the non-recording region 13 has texture which reduces frictional resistance between it and the slider. The texture reduces the frictional resistance between it and the slider so that the magnetic disk 11 can be rotated again in the state where the slider is positioned in contact with the texture surface, and has a wear resisting property enough to stand long-term friction between it and the slider. Therefore, there is a need for the actuator 15 to be driven so that the slider having the transducer 16 mounted thereon is retracted to the non-recording region 13 just before stoppage of the rotation of the magnetic disk 11, and the actuator needs to maintain the position until the magnetic disk 11 rotates again. If some external force acts on the actuator 15 positioned at the stop position, and once the slider is moved to the recording region 12 while rotation of the magnetic disk 11 is stopped, it will be difficult to drive the actuator 15 to retract the slider to the non-recording region 13 against the frictional resistance between the slider and the recording region 12. Also, even if an attempt were made to rotate the spindle motor, the frictional resistance between the slider and the recording region 12 is large and therefore the motor could not be rotated, or the slider would cause damage to the surface of the recording region 12 of the magnetic disk 11. Therefore, during stoppage of the rotation of the magnetic disk, the actuator needs to be locked to the base so that the slider is locked in the non-recording region 13. Hence, an actuator locking mechanism is adopted for locking the actuator in a predetermined position.

Still with reference to FIG. 1, the actuator locking mechanism will be described. In FIG. 1 a magnet support body 20 is attached to a base 25 rotatably on a shaft 22 near the rear end of the actuator 15, shown positioned at the stop position. The magnet support body 20 has a magnet 19 mounted thereon. At the stop position of the actuator 15, the magnet 19 can magnetically attract an iron piece 18 attached to the actuator 15. The magnet support body 20 further has a hole 23, and a fixing pin 24 which is inserted through the hole 23 and protrudes from the base 25. A torsion coil spring 21 is inserted on the shaft 22 so that one of the two arms engages with the fixing pin 24 and the other arm engages with an end portion of the magnet support body 20. Consequently the two arms of the spring 21 are elastically deformed so that elastic force is created when the arms move away from each other.

Figure 2:
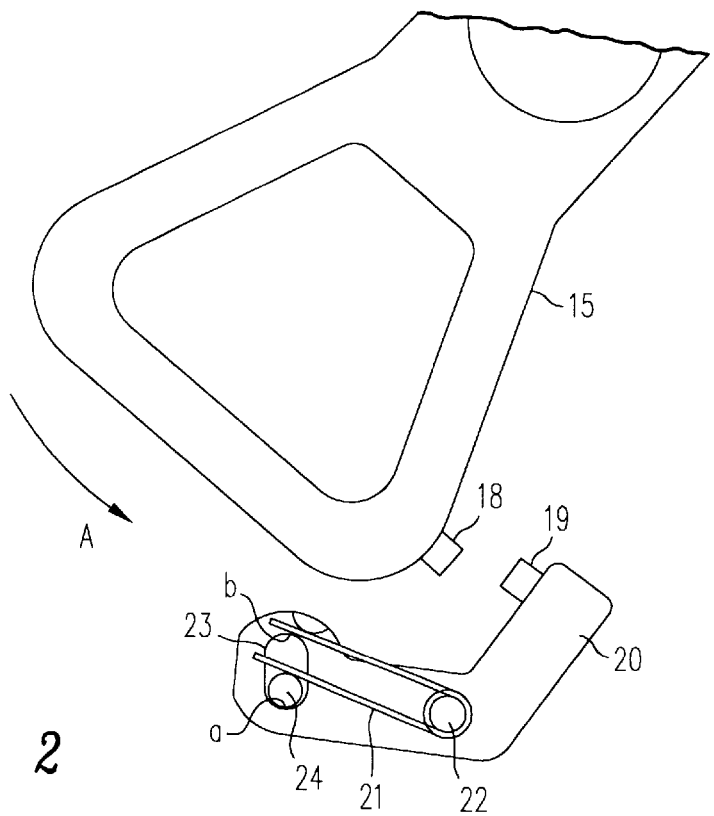
FIG. 2 is an enlarged plan view showing the state of the actuator not locked by the actuator locking mechanism.

Next, the operation of the actuator locking mechanism will be described in connection with FIGS. 2 through 4, which are partially enlarged views of the actuator locking mechanism of FIG. 1. FIG. 2 shows the state when the actuator 15 is being driven toward the stop position in a direction of arrow A, but the iron piece 18 has not been magnetically brought into contact with the magnet 19 yet. The magnet support body 20 is rotated by the elastic force of the two arms of the spring 21 in a range allowed by the a-point of the hole 23 and the fixing pin 24, and is stopped at a position where the fixing pin 24 and the a-point of the hole 23 abut each other. For the spring 21 in this embodiment, a SUS-316 wire of 0.3 mm in diameter is turned 6 times so that the diameter of the coil portion is about 4.5 mm, and the length of the arm portion is set to 9 mm.

Figure 3:
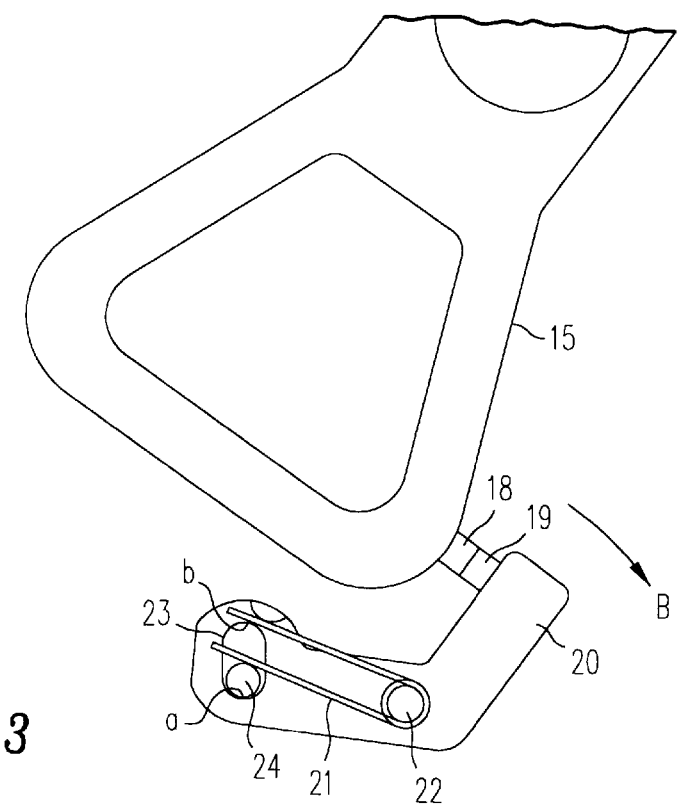
FIG. 3 is an enlarged plan view showing the state of the actuator locked by the actuator locking mechanism.

The state of the actuator 15, further driven to attract the magnet 19 and the iron piece 18 together, is shown in FIG. 3. In this state, the magnet support body 20 has been given force in a direction of arrow B by the elastic force of the spring 21, so the actuator 15 is fixed to the base 25 at the stop position.

Figure 4:
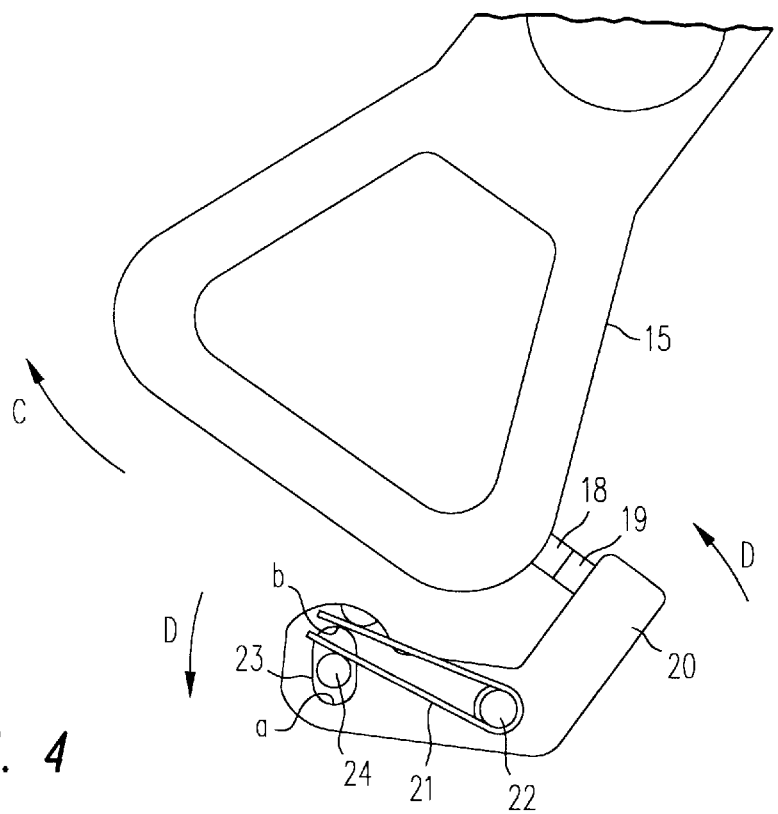
FIG. 4 is an enlarged plan view showing the state of the actuator locked by the actuator locking mechanism with an external impact force being applied to the actuator.

FIG. 4 shows the state where, when such an external impact force as to move the actuator 15 in a direction of arrow C is applied to the magnetic storage device in the state where the actuator 15 has been fixed to the base 25 through the actuator locking mechanism at the stop position as shown in FIG. 3, the magnet support body 20 is rotated on the shaft 22 in a direction of arrow D until the fixing pin 24 abuts the b-point of the hole 23. At this time, by rotation of the magnet support body 20, the spring 21 is elastically deformed to give the magnet support body 20 elastic force which resists the rotation of the magnet support body 20 in the direction of arrow D. The magnetic attraction between the magnet 19 and the iron piece 18 is set so as to be greater than the force that is applied to the magnet support body 20 by the elastic force of the spring 21. Therefore, when the actuator 15 is forcibly moved in the direction of arrow C, there is no separation between the magnet 19 and the iron piece 18 until the b-point and the fixing pin abut each other, and the force resisting the rotation of the actuator 15 in the direction of arrow C is applied to the actuator through the magnetic support body 20, the magnet 19, and the iron piece 18 by the elastic force of the spring 21. If impact force causes the actuator 15 to further rotate in the direction of arrow C against the elastic force applied to the magnetic support body 20 by the spring 21, the b-point of the hole 23 and the fixing pin 24 will abut each other and therefore the magnet support body 20 will not be rotated any further along with the actuator 15 and will be stopped. When the b-point of the hole 23 and the fixing pin 24 abut each other, the resultant impact force is absorbed and damped by the spring 21 deformed elastically while the magnetic support body 20 rotates in a range which is allowed by the fixing pin 24 and between the a-point and b-point of the hole 23. The magnetic attraction between the magnet 19 and the iron piece 18 is ensured sufficiently against the damped impact force, and consequently, the locking force of the locking mechanism against impact force is enhanced.

In order to drive the actuator 15 locked by the locking mechanism so that the transducer 16 is moved to the recording region 12 for reading or writing data, the magnetic disk 11 is first rotated in a state where the slider 11 is positioned on the non-recording region 13. The rotation of the magnetic disk 11 creates a thin cushion of air that floats the slider off the surface of the non-recording region 13. Then, in FIG. 4 the magnet support body 20 is rotated in the direction of arrow D until the b-point of the hole 23 abuts the fixing pin 24. Since the drive force for the actuator has been set so as to be greater than the magnetic attraction between the magnet 19 and the iron piece 18, they will be separated from each other if rotation of the magnet support body is stopped by the fixing pin 24, and consequently, the actuator 15 can be positioned over a desired track on the recording region 12.

Figure 5:
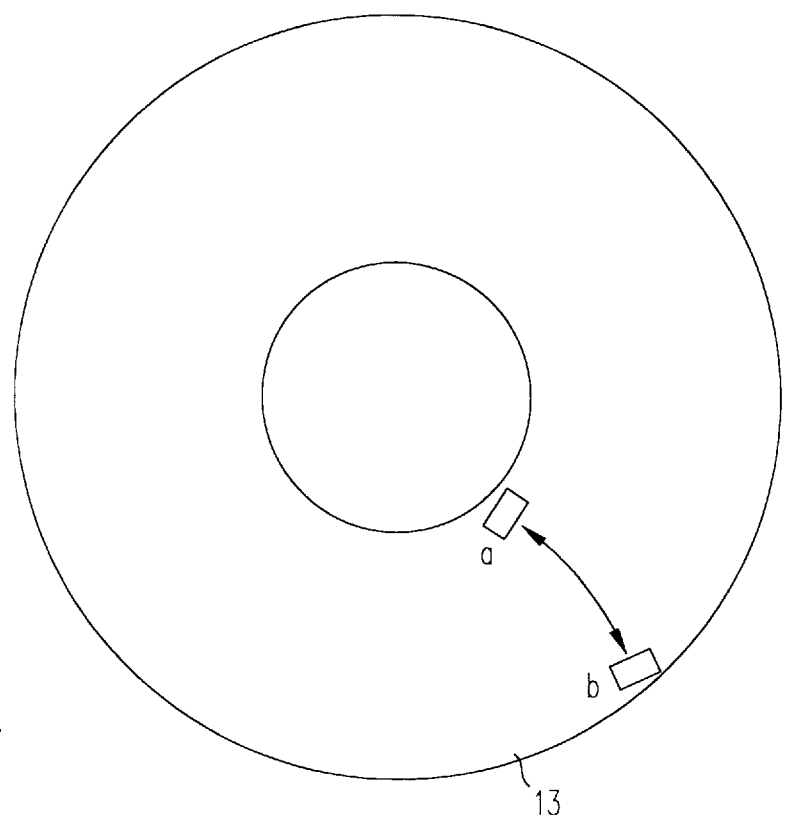
FIG. 5 is a plan view showing the range in which a slider is moved in a non-recording region that is determined by the stroke of a magnet support body.

The spacing between the a-point and the b-point of the hole 23 determines the range that the magnet support body 20 is rotated by the impact force applied to the actuator 15. This range determines the quantity of the elastic deformation of the spring 21 and accordingly determines the magnitude of the impact energy that the spring 21 can absorb. In order to increase the quantity of the impact energy that the spring 21 absorbs, it is preferable to lengthen the rotational stroke of the magnet support body 20. It is preferable that this stroke be set to a range such that the slider is not moved by impact force into the recording region 12 across the non-recording region 13. In order to make the stroke maximum with range and make absorbed energy maximum, the range of the stroke is set so that the slider can be positioned at the radial opposite ends of the magnetic disc 11 in the non-recording region 13, as shown in FIG. 5. That is, the stroke range of the fixing pin 24 is set so that the a-point of the hole 23 and the fixing pin 24 abut each other at the a-position of FIG. 5 and the b-point of the hole 23 and the fixing pin 24 abut each other at the b-position of FIG. 5. In this embodiment the rotational stroke of the magnet support body 20 is set to approximately 1 mm.

Figure 6:
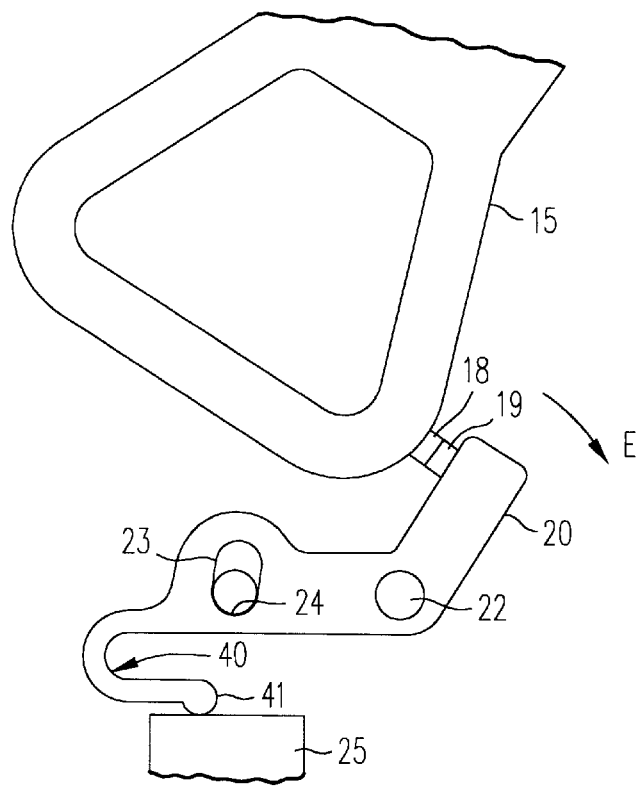
FIG. 6 is an enlarged plan view showing a second embodiment of the actuator locking mechanism of the present invention.

Another embodiment of the present invention will hereinafter be described. The same reference numerals denote members which perform nearly the same operation described in connection with the embodiment of FIGS. 1 through 4 and therefore the operation and description are omitted to avoid redundancy. FIG. 6 illustrates an example where the spring 21 in the embodiment shown in FIGS. 1 through 4 is formed as part of the magnet support body 20. A portion of the magnet support body 20 is formed into a curved portion 40, and the end portion 41 abuts a base 25, as shown in FIG. 6. With the curved portion 40 deformed inwardly and elastically, a rotational force in a direction of arrow E is applied to the magnet support body 20 set on a shaft 22 by the elastic force of the curved portion 40. This embodiment is advantageous in fabricating and assembling components, because the magnet support body 20 and the spring can be formed in one body together. It is desirable that the material of the magnet support body 20 be synthetic resin suitable for integral formation.

Figure 7:
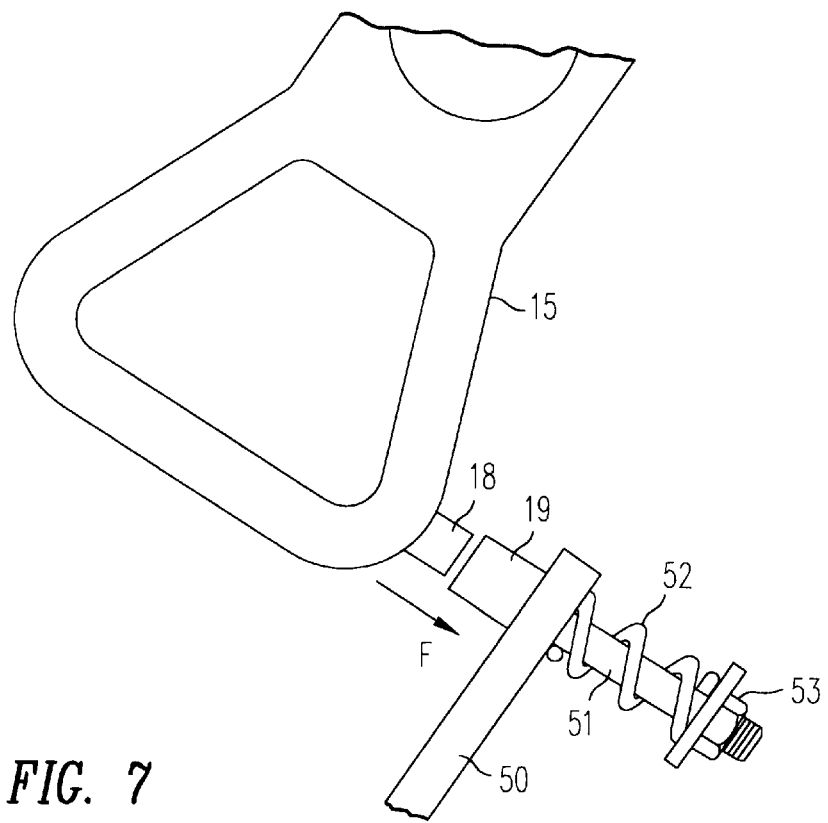
FIG. 7 is an enlarged plan view showing a third embodiment of the actuator locking mechanism of the present invention.

FIG. 7 illustrates a third embodiment of the present invention where a magnet 19 linearly moves. A rod 51 penetrates a support member 50 fastened to a base and has the magnet 19 mounted on its one end. The other end of the rod 51 is provided with a bolt 53, and the bolt 53 is fixed to the rod 51 so that a compression coil spring 52 is compressed between the support member 50 and the bolt 53. Therefore, force is applied to the magnet 19 through the rod 51 in a direction of arrow F by the elastic force of the spring 52. In the same operation with the embodiment of FIG. 1, an external impact force is absorbed as impact energy by the spring 52.

Figure 8:
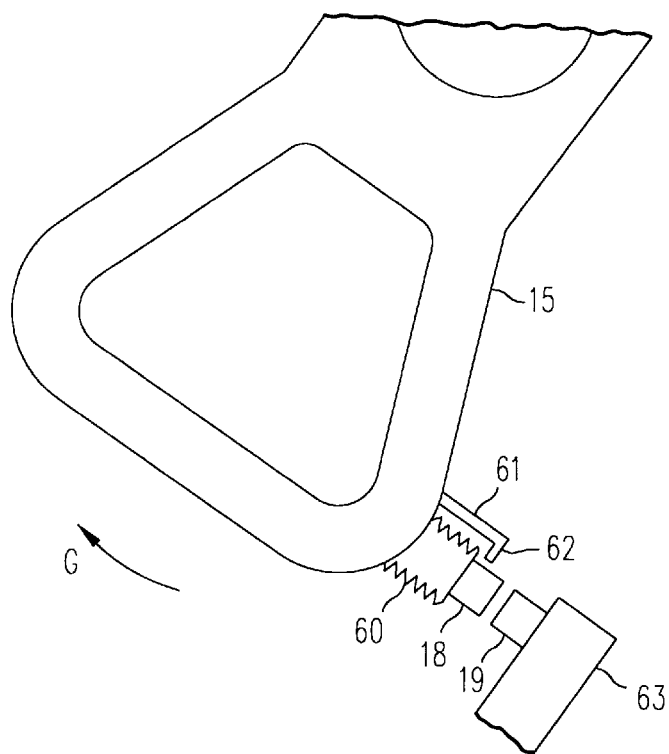
FIG. 8 is an enlarged plan view showing a fourth embodiment of the actuator locking mechanism of the present invention.

FIG. 8 illustrates a fourth embodiment of the present invention where a spring is provided on the side of an actuator. An iron piece 18 is attached to an actuator 15 through a tension spring 60. A magnet 19 is supported by a support member 63, and the support member 63 is fixed to the base 25. If impact force is applied to the actuator 15 in a direction of arrow G for rotation in the state where the iron piece 18 and the magnet 19 have been attracted with each other, the spring 60 will apply elastic force to the actuator 15, while the spring 60 is being elastically deformed so as to be pulled in the direction of the front end 62 of a stopper 61. The front end of the spring 60 abuts the front end 62 of the stopper 61, and rotation of the actuator 15 is stopped.

In the previously described embodiments, while the iron piece 18 has been provided on the side of the actuator 15, the magnet may also be provided on the side of the actuator and the iron piece may also be provided opposite the magnet. Also, both may be comprised of magnets. In addition, the actuator is not limited to rotary types but it is applicable to linear types. Furthermore, while the embodiments have been described with reference to a magnetic storage device, the actuator locking mechanism of the present invention is not limited to an application to magnetic storage device but it is generally applicable to information storage units employing an actuator, such as an optical storage. Moreover, the aforementioned spring may also be replaced with elastic materials such as rubbers and plate springs.

Figure 9A:
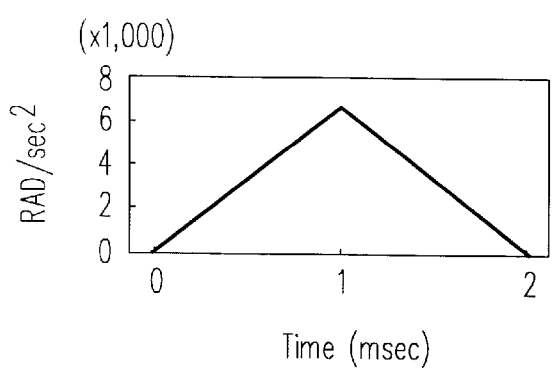
FIGS. 9(*a*) and 9(*b*) are graphs showing comparison of the present invention and a conventional locking mechanism for the quantity of absorbed energy.
Figure 9B:
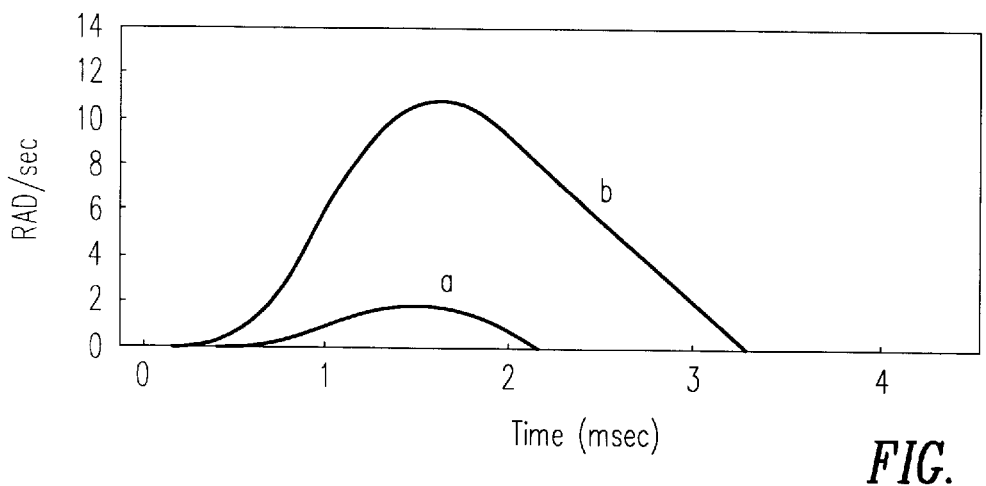

FIG. 9 shows comparison of the actuator locking mechanism of the embodiment shown in FIG. 1 and a conventional fixed magnet type locking mechanism. When an external impact force having a 2-msec triangular waveform such as that shown in FIG. 9(a) (where its peak is 7000 rad/sec$^2$) is applied to a magnetic storage device, the impact energy is absorbed by the embodiment of FIG. 1 and the conventional locking mechanism. In the computation result of the energy absorption quantity shown in FIG. 9(b), it is shown that the conventional fixed magnet type of a graph 9(a) is 7000 rad/sec$^2$ and that the locking mechanism of the present invention is 23000 rad/sec$^2$ and absorbs more than three times that of the conventional fixed magnet type. Therefore, it follows that the present invention attenuates the impact force applied to the magnetic attracted portion between the magnet and the iron piece and exhibits a strong locking force.

Figure 10:
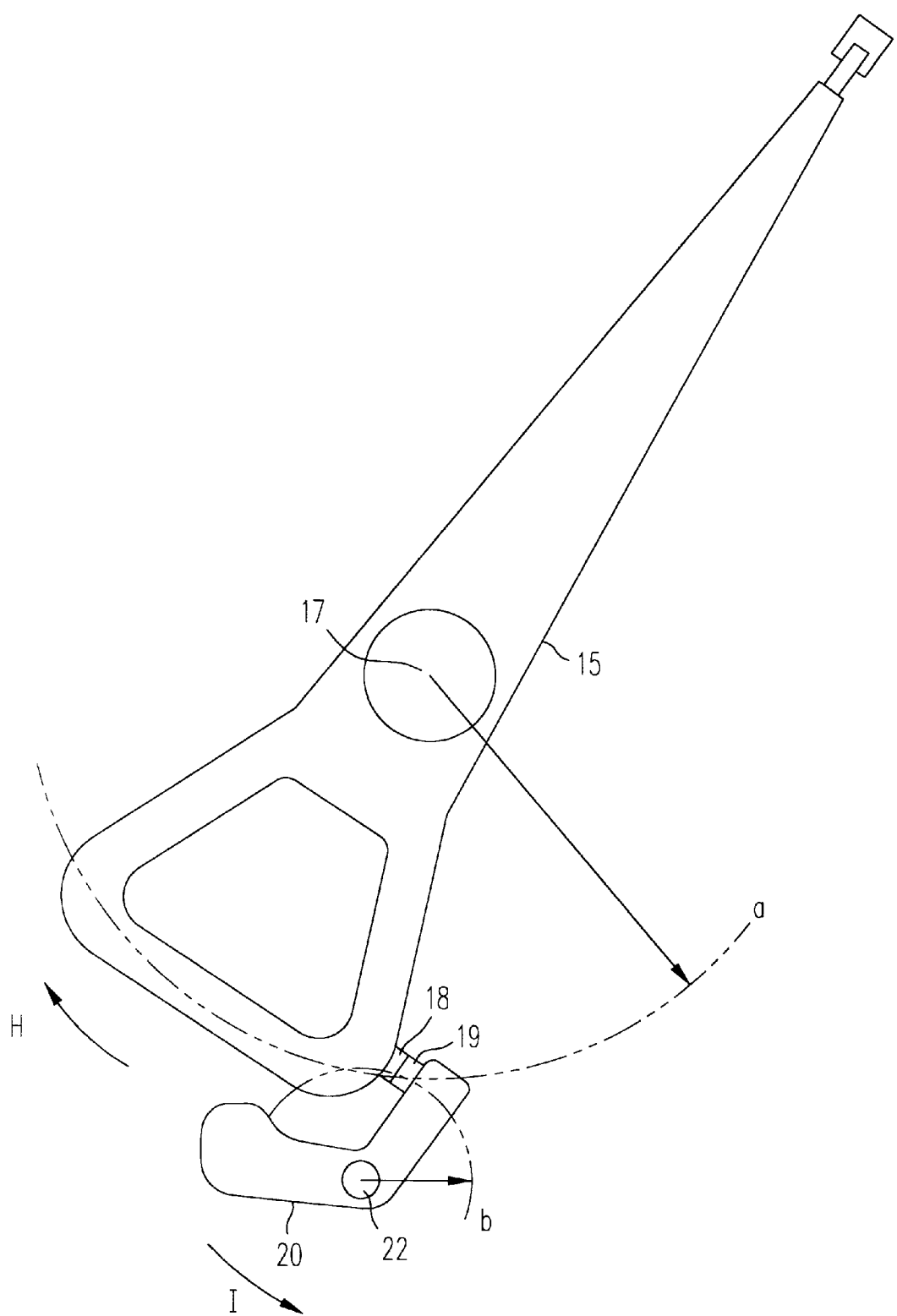
FIG. 10 is a schematic plan view showing a fifth embodiment of the actuator locking mechanism of the present invention.

Next, a description will be made of a fifth embodiment of the present invention where a locking force is further enhanced. FIG. 10 is the same plan view as the embodiment shown in FIG. 1 for describing the fifth embodiment. In FIG. 10, when an actuator is rotated in a direction of arrow H by impact force and accordingly a magnet support body 20 is rotated in a direction of arrow I, an iron piece 18 rotates on a shaft 17 along a certain locus-a on the circumference and a magnet 19 rotates on a shaft 22 along a certain locus-b on the circumference. Therefore, both loci do not match each other. The attracting surfaces of the iron piece 18 and the magnet 19 are formed into a plane, and when both attracting surfaces are magnetically attracted with each other without any gap, the maximum attraction is exhibited. Now, assume that the iron piece 18 is fastened to the actuator 15 so that in the state where the actuator is locked as shown in FIG. 3, the attracting surfaces of the iron piece and the magnet 19 are magnetically attracted with each other without any gap. It is also assumed that the magnet 19 is likewise fastened to the magnet support body 20. As shown in FIG. 10, if the actuator 15 and the magnet support body 20 are rotated, the iron piece 18 and the magnet 19 will be moved along the locus-a and the locus-b, respectively. Therefore, the attracting surfaces cannot maintain the original state having no gap, and as the rotation advances, the attracted area is gradually reduced and therefore the attraction is reduced.

Figure 11:
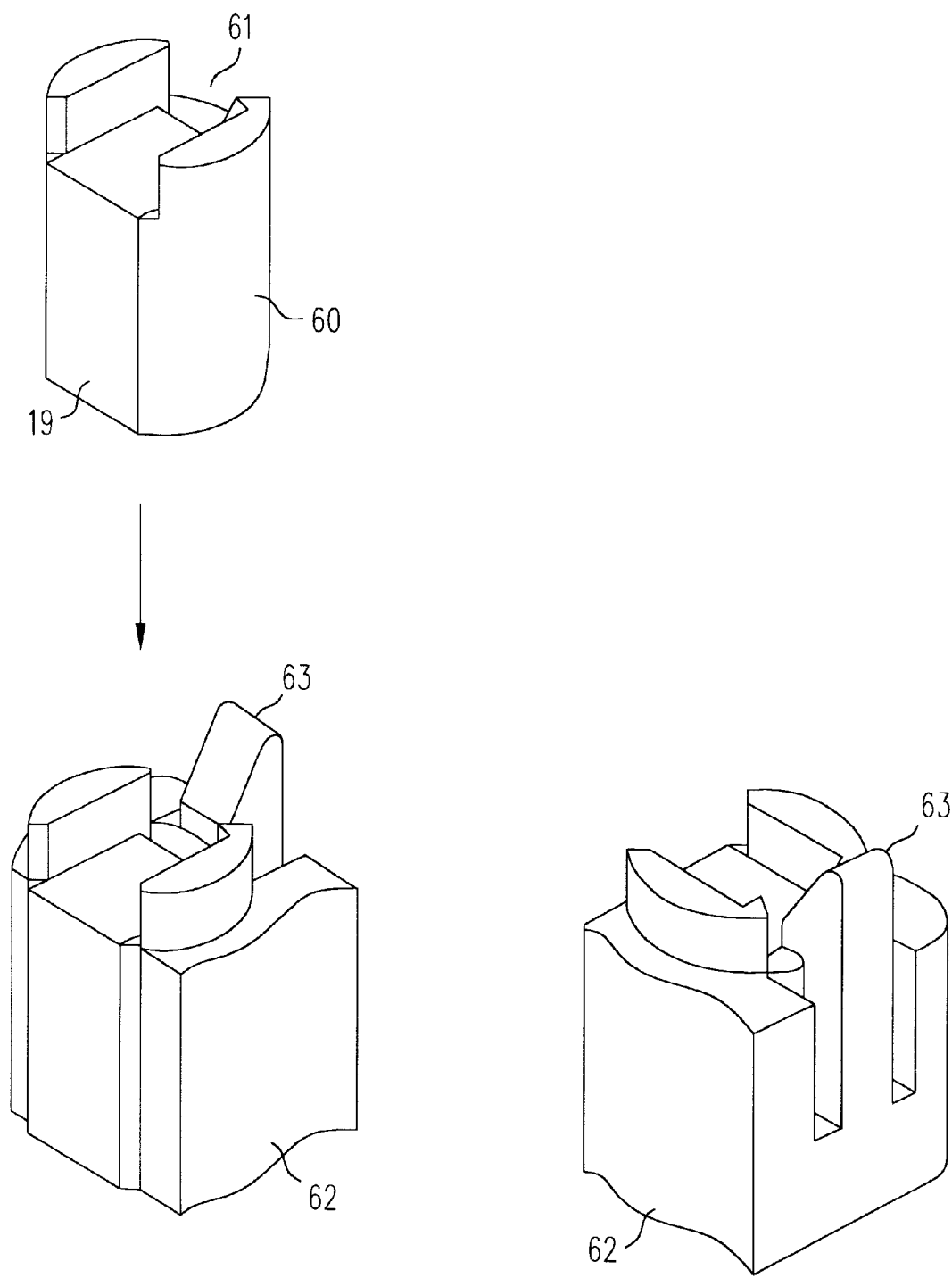
FIG. 11 is a perspective view showing a sixth embodiment of the actuator locking mechanism of the present invention, wherein the attracting force is further enforced.

FIG. 11 illustrates a sixth embodiment of the present invention which solves the problem described in connection with FIG. 10. A holding member 62 is fixed to the magnet support body 20, and a cylindrical member 60 with a magnet 19 is inserted into the holding member 62 so that it can freely rotate. The cylindrical member 60 is provided with a cutout 61, and the cover 63 of the holding member 62 is positioned within the cutout 61 when the cylindrical member 60 is inserted into the holding member 62. When the cylindrical member 60 with the magnet 19 is inserted into the holding member 62, the cylindrical member 60 can rotate within the holding member 62 in a range which is allowed by the cutout 61 and the cover 63. The magnet 19, inserted in the holding member so as to be freely rotatable along the cylindrical member 60, is rotated along the inner surface of the holding member 62 along with the cylindrical member 60 so that the attracted surfaces maintain the original maximum area, even when there is a difference between the locus of the iron piece 18 and the locus of the magnet 19 when the actuator is rotated by an external impact force. For this reason, the magnetic attraction is not reduced by the rotation of the actuator caused by an external impact force, and consequently, the magnetic attraction is increased. An increase in the magnetic attraction renders it possible to select a spring having a large elastic force and even further increases the absorption quantity of impact energy.

As has been described, the present invention provides an actuator locking mechanism having a strong locking force which could not be achieved by the conventional fixed magnet type actuator locking mechanism. Furthermore, there is provided an information storage device equipped with both a strong actuator locking method employing a magnet and this locking mechanism.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. An actuator locking mechanism for use with an information storage device which locks an actuator to a base to avoid being moved with impact force, the mechanism comprising:

said actuator on which a transducer for transferring information between the transducer and a storage medium is mounted and which is driven to scan the storage medium;

a support member pivotally attached to the base at a pivot point, said support member comprising a first and a second arm extending from said pivot in opposite directions;

an attracting member mounted on the first arm of the support member, which is attractable with at least a portion of said actuator at a stop position of said actuator; and a u-shaped elastic member attached at the pivot point of the support member and having two arms extending outward therefrom towards an end of the second arm of the support member, said elastic member having a range of motion defined by the contact between the outer side of the arms of the u-shaped elastic member and a hole at the end of the second arm of said support member and a fixing pin extending therethrough;

wherein said elastic member is elastically deformed to give elastic force to said actuator by impact force given to the information storage device during the time the portion of said actuator is attracted to said attracting member, whereby said elastic member absorbs the impact force.

2. The actuator locking mechanism as set forth in claim 1, wherein the attraction of said attracting member is magnetically performed.

3. The actuator locking mechanism as set forth in claim 1, wherein said attracting member is rotatably attached to said support member.

4. A method for locking an actuator to a base to avoid being moved with impact force in an information storage device, the method comprising the steps of:

providing said actuator on which a slider having a transducer for transferring information between the transducer and a storage medium is attached and which is driven to scan the storage medium;

driving the actuator to a position at a region other than a recording region of the storage medium;

providing a support member pivotally attached to the base at a pivot point, the support member comprising a first and a second arm extending from said pivot in opposite directions, an attracting member mounted on the first arm of the support member, which is attractable with at least a portion of said actuator at a stop position of said actuator, and a un-shaped elastic member attached at the pivot point of the support member and having two arms extending outward therefrom towards an end of the second arm of the support member, said elastic member having a range of motion defined by the contact between the outer side of the arms of the u-shaped elastic member and a hole at the end of the second arm of said support member and a fixing pin extending therethrough;

locking the actuator to the base by attracting a portion of the driven actuator;

wherein said elastic member is elastically deformed to give elastic force to said actuator by impact force given to the information storage device during the time the portion of said actuator is attracted to said attracting member, whereby said elastic member absorbs the impact force.

5. The method as set forth in claim 4, wherein the locking step further includes the step of magnetically attracting a portion of the driven actuator.

* * * * *